United States Patent
Choi

(10) Patent No.: US 10,201,777 B2
(45) Date of Patent: Feb. 12, 2019

(54) SCRUBBER WITH MULTI-FILTERING SYSTEM

(71) Applicant: KUMHO ENV CO., LTD., Sungnam-si, Kyunggi-do (KR)

(72) Inventor: Seung Uk Choi, Seongnam-si (KR)

(73) Assignee: KUMHO ENV CO., LTD., Sungnam-si (KR)

( * ) Notice: Subject to any disclaimer, the term of this patent is extended or adjusted under 35 U.S.C. 154(b) by 293 days.

(21) Appl. No.: 14/552,811

(22) Filed: Nov. 25, 2014

(65) Prior Publication Data

US 2015/0145152 A1    May 28, 2015

(30) Foreign Application Priority Data

Nov. 25, 2013 (KR) .................. 10-2013-0143822

(51) Int. Cl.
| | | |
|---|---|---|
| *B01D 53/14* | (2006.01) | |
| *B01D 53/18* | (2006.01) | |
| *B01D 53/78* | (2006.01) | |
| *B01D 45/16* | (2006.01) | |
| *B01D 47/06* | (2006.01) | |

(52) U.S. Cl.
CPC ....... *B01D 53/1406* (2013.01); *B01D 53/185* (2013.01); *B01D 53/78* (2013.01); *B01D 45/16* (2013.01); *B01D 47/06* (2013.01); *B01D 53/18* (2013.01); *B01D 2257/302* (2013.01); *B01D 2257/404* (2013.01); *B01D 2257/90* (2013.01); *B01D 2258/06* (2013.01)

(58) Field of Classification Search
CPC ..... F28D 13/00; B01D 53/1406; B01D 53/78; B01D 53/185; B01D 45/16; B01D 47/06; B01D 2258/06; B01D 2257/90; B01D 2257/404; B01D 53/18; B01D 2257/302
See application file for complete search history.

(56) References Cited

U.S. PATENT DOCUMENTS

| | | | | |
|---|---|---|---|---|
| 3,210,914 A | * | 10/1965 | Eckert ................ | B01D 47/06 261/117 |
| 3,885,929 A | * | 5/1975 | Lyon .................. | B01D 53/68 422/169 |
| 3,971,642 A | * | 7/1976 | Perez ................. | B01D 47/06 261/118 |

(Continued)

FOREIGN PATENT DOCUMENTS

| KR | 20000001345 A | * | 1/2000 |
|---|---|---|---|
| KR | 10-0689620 B | | 3/2007 |

(Continued)

*Primary Examiner* — Stephen Hobson
(74) *Attorney, Agent, or Firm* — Sughrue Mion, PLLC

(57) ABSTRACT

A deodorizer system for cleaning polluted gas is provided. The system includes a first deodorizer sub-system including a first tank containing cleaning first fluid therein, a first diffractive plate disposed above the first tank, a first eliminator installed above the first diffractive plate, and a second deodorizer sub-system disposed above the first deodorizer sub-system, wherein the second deodorizer sub-system includes a distribution plate, a second tank containing second fluid, a second diffractive plate installed above the distribute plate, a multi-filter installed above the second diffractive plate; and a second eliminator installed above the multi-filter.

3 Claims, 4 Drawing Sheets

(56) References Cited

U.S. PATENT DOCUMENTS

| | | | | |
|---|---|---|---|---|
| 4,028,077 A * | 6/1977 | Gleason | B01D 45/08 | 55/442 |
| 4,157,250 A * | 6/1979 | Regehr | B01D 47/06 | 55/424 |
| 4,204,847 A * | 5/1980 | Ko | B01D 45/08 | 55/440 |
| 4,507,253 A * | 3/1985 | Wiesmann | B01F 3/0451 | 210/221.2 |
| 5,201,919 A * | 4/1993 | Jahn | B01D 47/06 | 96/262 |
| 5,512,072 A * | 4/1996 | Laslo | B01D 47/06 | 96/234 |
| 6,277,343 B1 * | 8/2001 | Gansley | B01D 53/40 | 422/168 |
| 6,344,074 B1 * | 2/2002 | Ward | B01D 46/0036 | 126/299 D |
| 6,550,751 B1 * | 4/2003 | Brown | B01D 47/06 | 261/113 |
| 6,726,748 B2 * | 4/2004 | Goode | B01D 53/1468 | 29/401.1 |
| 7,147,692 B2 * | 12/2006 | Fornai | B01D 47/06 | 95/210 |
| 7,748,688 B2 * | 7/2010 | Bessettes | B01J 19/32 | 261/94 |
| 8,292,992 B2 * | 10/2012 | Sato | B01D 45/08 | 96/244 |
| 8,496,742 B2 * | 7/2013 | Konishi | B01D 53/18 | 96/322 |
| 2004/0050970 A1 * | 3/2004 | Bowman | B05B 1/3436 | 239/494 |
| 2009/0166902 A1 * | 7/2009 | Lee | F28C 1/02 | 261/159 |
| 2012/0195816 A1 * | 8/2012 | Dube | B01D 53/343 | 423/220 |
| 2012/0207658 A1 * | 8/2012 | Dube | B01D 53/1406 | 423/220 |
| 2014/0053792 A1 * | 2/2014 | Park | F23J 15/06 | 122/20 B |
| 2014/0219898 A1 * | 8/2014 | Nakamura | B01D 53/1406 | 423/220 |
| 2015/0174519 A1 * | 6/2015 | Zhang | B01J 20/20 | 95/224 |
| 2016/0368785 A1 * | 12/2016 | Zamir | C02F 1/16 | |

FOREIGN PATENT DOCUMENTS

| | | |
|---|---|---|
| KR | 10-0844178 B | 7/2008 |
| KR | 10-1300143 B | 8/2013 |

* cited by examiner

SCRUBBER WITH MULTI-FILTERING SYSTEM

CROSS-REFERENCE TO RELATED APPLICATION

This application claims the benefit of Korea patent application No. 10-2013-0143822 filed on Nov. 25, 2013, the entire content of which is incorporated herein by reference for all purposes as if fully set forth herein.

BACKGROUND

Field of the Invention

The present invention relates to a diffractive deodorizer for removing $SO_x$, $NO_x$, dust, organic matter etc. contained in gas generated from food disposal plant, livestock manure disposal plant, sewage disposal plant or various industrial sites by absorbing them into fluid. More particularly, the present invention relates to a multi-stage multifilter type diffractive deodorizer having a high deodorizing efficiency.

Discussion of Related Art

There have been developed various types of deodorizers which cleans polluted air giving off bad smell of high concentration or containing harmful components such as $SO_x$, $NO_x$, dust, organic matter etc. by deodorizing the air. Such deodorizers perform deodorization by mainly contacting the polluted gas with dispersed liquid particles and thus absorbing the harmful components into the liquid or perform the deodorization by the use of adsorbent.

The applicant has developed, as apparatus for cleaning stinking gas or harmful gas, an ultrasonic diffractive scrubber which enhances cleaning performance by installing a diffractive plate in the scrubber and further using ultrasonic waves, which scrubber has been patented in Korean Patent No. 652,969.

Furthermore, the applicant has developed a diffractive ultrasonic active carbon adsorption tower cleaning apparatus of ozone feed type which enhances the cleaning efficiency by installing an ozone generator, a diffractive plate and an ultrasonic oscillator in an active carbon adsorption tower cleaning apparatus, which apparatus has been patented in Korean Patent No. 689,620.

Furthermore, the applicant has developed a deodorizer in which a gas circulation pipe is installed for circulating part of gas treated in a main body through a gas feeding pipe and thus a pressure of the gas flowing into the main body is kept constant and which maximizes an impingement jet effect to exhibit an excellent cleaning efficiency, which deodorizer has been patented in Korean Patent No. 844,178.

Prior deodorizers including the patented inventions all adopt a principle of removal of bad smell where cleaning liquid consisting of water or chemical liquid is sprayed through nozzles and the sprayed cleaning liquid is contacted with the stinking gas to be cleaned. However, such prior arts suffer from several critical disadvantages. Firstly, cleaning efficiency is difficult to be enhanced since the stinking gas is deodorized by the sprayed cleaning liquid, and secondly, scale is formed on the diffractive plate or mixer plate internally installed due to various pollutants, and thirdly, for increasing contact area of the sprayed cleaning liquid and stinking gas, a contact time has to be extended and the volume of apparatus has to be large. In a case where the volume of apparatus is small, a plurality of deodorizers have to be installed in parallel, and therefore a large area is also occupied.

In order to solve the problems of prior deodorizers as described above, the applicant has developed a mixer deodorizer where cleaning liquid forms a layer of cleaning liquid movable in a vortex diffractive manner and stinking gas passes through the layer of cleaning liquid and thus harmful components are absorbed into the liquid, thereby increasing the cleaning efficiency and where the apparatus can have a small volume and be made compact thanks to the increase of the cleaning efficiency, while deviating from the prior principle of contacting the particles of cleaning liquid sprayed through the spray nozzles with gaseous particles of the stinking gas, which mixer deodorizer has been patented in Korean Patent No. 948,652. According to this patent, a a plurality of perforated plates are used and gas is passed through holes of the perforated plates by a blower and a layer of cleaning liquid is formed above the perforated plates and thus harmful components are absorbed into the cleaning liquid. A plurality of iron balls are used in order to prevent the cleaning liquid from flowing out downward through the holes of the perforated plates. Furthermore, for allowing passage of the gas, gas, a pressure has to be maintained which is strong to such an extent that the iron balls float upward. In other words, the blower has to always blow out the gas into the layer of cleaning liquid with a high pressure. By the fact that, like this, the blower has to be always run with a high pressure, it is meant that a lot of power is consumed. For example, there is a disadvantage that a strong pressure has to be always ensured even when the blower has to be run with a low pressure since the pressure of the gas is low or the amount of the gas is small. There is a disadvantage that loss of power is so great and the cleaning efficiency is reduced.

The applicant has developed a scrubber where a vortex diffractive plate normally consisting of four rectangular diffractive plates (40) is installed and the gas which has passed through a layer of cleaning liquid is diffracted and forms the vortex in order that power consumption can be drastically reduced by allowing smooth running even at a high pressure and also a low pressure and furthermore the cleaning efficiency can be increased, which scrubber has been already patented in Korean Patent No. 1300143.

The present invention relates to a deodorizer having a novel configuration which is more excellent in efficiency than any scrubber developed by the inventor and thus can maximize the deodorizing effect.

SUMMARY OF THE INVENTION

An object of the present invention is to provide a deodorizer which increases the deodorizing effect by forming a vortex of the cleaning liquid and polluted gas by means of the impingement jet principle or spray nozzle principle by forcibly contacting the polluted gas with the cleaning liquid with a high pressure when the polluted gas flows into the deodorizer.

Another object of the present invention is to provide a deodorizer which increases the deodorizing effect by cleaning the cleaning liquid and the gas forming the vortex in a first stage diffractive plate and then again cleaning them in a second stage diffractive plate.

Yet another object of the present invention is to provide a deodorizer which increases the cleaning effect by using separate tanks separated from each other for the cleansing liquid used in the first stage diffractive plate and the cleansing liquid used in the second stage diffractive plate.

Yet another object of the present invention is to provide a deodorizer which increases the cleaning effect by installing eliminators after a cleaning stage in the first stage diffractive plate and a cleaning stage in the second stage diffractive plate, respectively.

Yet another object of the present invention is to provide a deodorizer which increases the cleaning effect by forming a multifilter layer and allows the multifilter layer to be easily withdrawn outward and convenient in maintenance.

The above and other objects of the present invention can be solved by the present invention described in detail below.

In a multi-stage multifilter type diffractive deodorizer (100) for cleaning polluted gas according to present invention, a slopping prevention plate (32), a diffractive plate (30), a vertical member (33) and an inclined member (34) are installed within a lower part of the deodorizer for performing a primary deodorization by mixing gas flowing in through a gas feeing duct (31) and cleaning liquid and thus causing an impingement jet effect, an eliminator (36) is installed above the diffractive plate (30), a distribution plate (41), a diffractive plate (40) and a multifilter (42) are installed above the eliminator (36) for performing a secondary deodorization, an eliminator (43) is installed above the multifilter (42), the cleaning liquid that has overflowed the diffractive plate (30) circulates along a pipe (21) into a tank (20), and the cleaning liquid is fed to the diffractive plate (40) through a pipe (12) and the cleaning liquid that has overflowed the diffractive plate (40) circulates along a pipe (13) into the tank (10).

The multifilter (42) comprises four assembled filters. Each filter is produced by shaping a sheet-like filter (421) into a cylindrical filter (422), and a plurality of the cylindrical filters are arranged in zigzag with every two adjacent non-perforated portions being oppositely positioned. In the sheet-like filter (421) and the cylindrical filter (422) of the FIG. 6, a portion shown in black is the non-perforated portion and the rest is a portion where holes are punched at constant intervals.

The cleaning liquid in the tank (10) is fed along the pipe (12) to an upper side of the distribution plate (41) by a circulation pump (11).

Hereinafter, the present invention will be described in detail with reference to the attached drawings.

The diffractive deodorizer of the present invention increases the deodorizing effect by forming a vortex of the cleaning liquid and polluted gas by means of the impingement jet principle or spray nozzle principle by forcibly contacting the polluted gas with the cleaning liquid with a high pressure when the polluted gas flows into the deodorizer, and increases the cleaning effect by forming a multifilter layer and allows the multifilter layer to be easily withdrawn outward and convenient in maintenance.

DETAILED DESCRIPTIONS

The present invention relates to a diffractive deodorizer for removing pollutants contained in polluted gas, more particularly, a multi-stage multifilter-type diffractive deodorizer having a high deodorizing efficiency.

Figure 1:
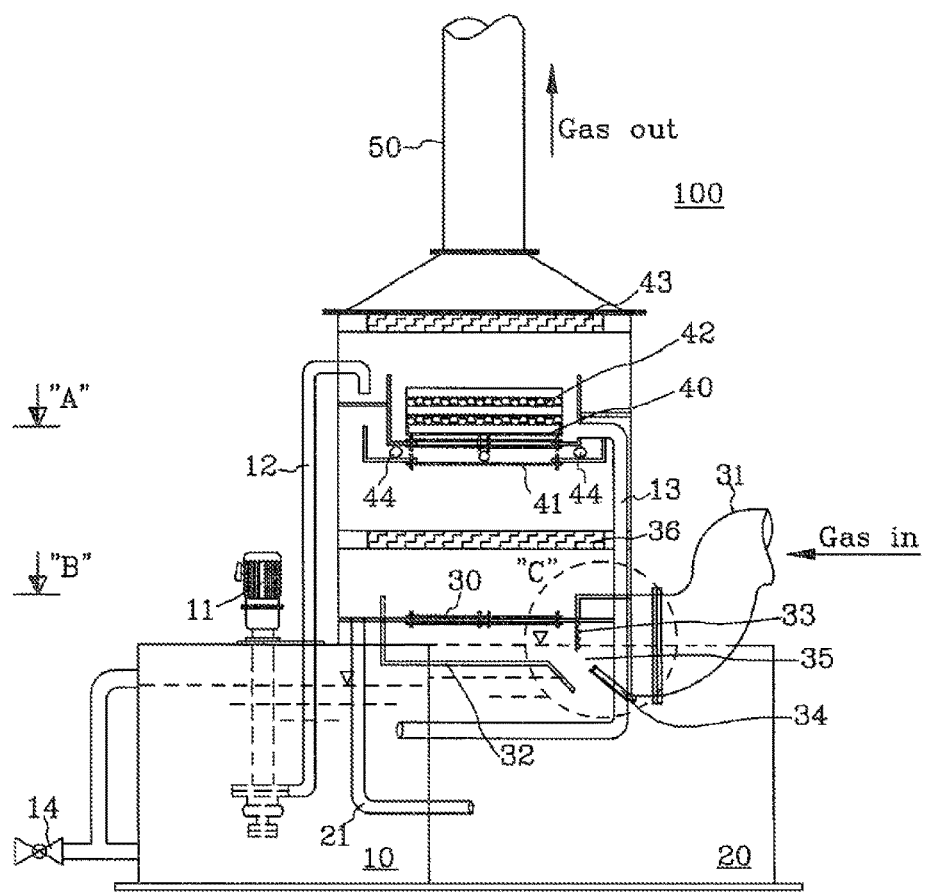
FIG. 1 is a schematic configuration view illustrating a configuration of the multi-stage multifilter-type diffractive deodorizer according to the present invention.

FIG. 1 is a schematic configuration view illustrating a configuration of the multi-stage multifilter-type diffractive deodorizer according to the present invention.

As illustrated in FIG. 1, the multi-stage multifilter type diffractive deodorizer (100) of the present invention includes a primary deodorization system for performing a primary deodorization by mixing gas flowing in through a gas feeing duct (31) at a lower part of a cylindrical body of the deodorizer and cleaning liquid and thus causing an impingement jet effect; and a secondary deodorization system for performing a secondary deodorization above the primary deodorization system. A tank (20) for storing the cleaning liquid circulating in the primary deodorization system and a tank (10) for storing the cleaning liquid circulating in the secondary deodorization system are separately installed, whereby deodorization efficiency can be increased.

Figure 3:
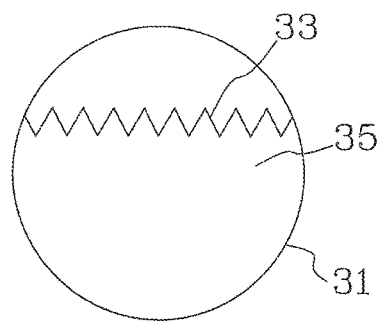
FIG. 3 is a schematic right-side view of a part "C" of FIG. 1.

The primary deodorization system has a lopping prevention plate (32), a diffractive plate (30), a vertical member (33) and an inclined member (34) installed within a lower part of the deodorizer for performing the primary deodorization by mixing the gas flowing in through the gas feeing duct (31) and the cleaning liquid and thus causing the impingement jet effect. Since the polluted gas flowing in through the gas feeding duct (31) has a high pressure, the gas is mixed with the cleaning liquid to cause the impingement jet effect (or spray nozzle effect or orifice effect) by the slopping prevention plate (32), diffractive plate (30), vertical member (33) and inclined member (34) installed within the lower part of the deodorizer, whereby the pollutants are primarily deodorized by the cleaning liquid. The high-pressure polluted gas is mixed with the cleaning liquid while passing through a gap (35) formed between the vertical member (33) and the inclined member (34), and then is jetted upwards, thus providing the impingement jet effect. The impingement jet effect is provided by the diffractive plate (30), the vertical member (33) and the inclined member (34), but the slopping prevention plate (32) is further installed below the diffractive plate (30) to prevent a slopping phenomenon of the cleaning liquid. FIG. 3 is a schematic right-side view of a part "C" of FIG. 1.

Figure 4:
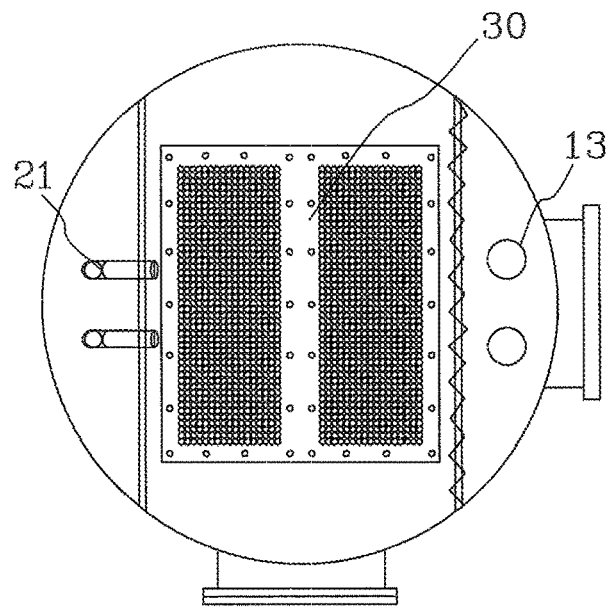
FIG. 4 is a plane view taken along a horizontal plane "B" of FIG. 1.

The diffractive plate (30) used in the present invention includes two assembled perforated plates eccentrically arranged. For the diffractive plate of the present invention, a diffractive plate used in conventional deodorizer may be used as it is, and thus the diffractive plate of the present invention can be easily embodied by those skilled in the art. FIG. 4 is a plane view taken along a horizontal plane "B" of FIG. 1.

The gas which has been primarily cleaned while passing through the diffractive plate (30) flows upward and is cleaned again by an eliminator (36). For the eliminator used in the present invention, an eliminator used in conventional deodorizer may be used as it is, and thus the eliminator of the present invention can be easily embodied by those skilled in the art.

The gas which has passed through the eliminator (36) flows along a lateral space to a diffractive plate (40). A distribution plate (41) is centrally installed, and thus the gas flows along the lateral space to the diffractive plate (40).

Figure 5:
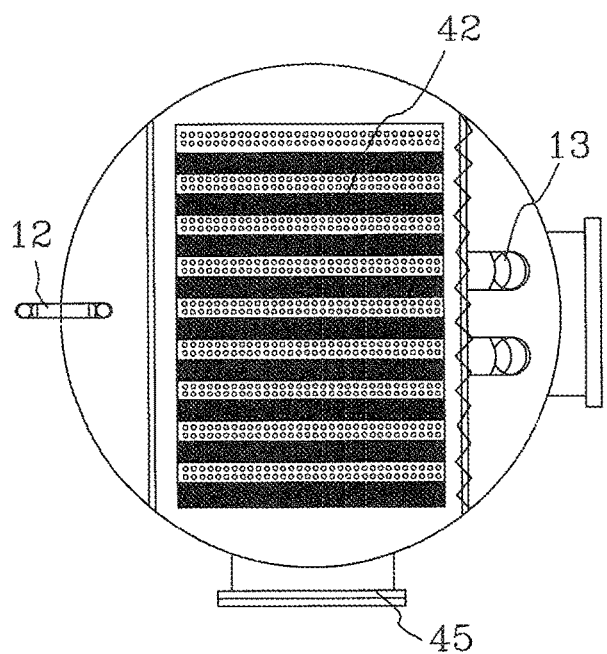
FIG. 5 is a plane view taken along a horizontal plane "A" of FIG. 1.

Since the cleaning liquid flows in the diffractive plate (40), the gas is secondarily deodorized while passing through the diffractive plate. The gas which has passed through the diffractive plate (40) is further cleaned while passing through a multifilter (42). The gas which has passed through the multifilter (42) is finally cleaned while passing through an eliminator (43) installed above the multifilter (42). FIG. 5 is a plane view taken along a horizontal plane "A" of FIG. 1.

Figure 2:
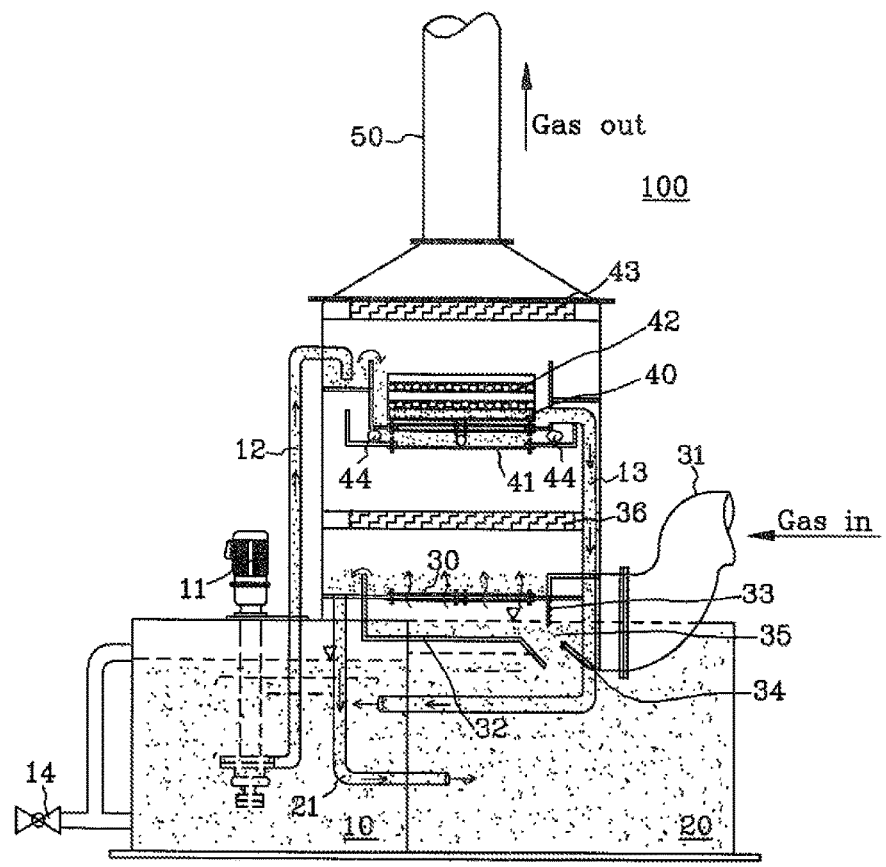
FIG. 2 is a configuration view illustrating a flow of the cleaning liquid in the multi-stage multifilter type diffractive deodorizer according to the present invention.

In both lateral portions of a space between the diffractive plate (40) and the distribution plate (41), vortex-type nozzles (44) of a linear pipe form may be installed which inject the cleaning liquid. The vortex-type nozzles (44) are illustrated only for their cross sections as FIGS. 1 and 2 are front views. The vortex-type nozzles (44) are in a linear form when viewed from side. The vortex-type nozzles (44) may be connected to a pipe (12) to jet out the cleaning liquid, though not illustrated. The vortex-type nozzles (44) may have a plurality of holes (not shown) formed therein to spray the cleaning liquid through the holes, thereby increasing the effect of cleaning of the gas. The vortex-type nozzles (44) may be easily embodied by those skilled in the art.

In the specific embodiment illustrated in FIG. 1 of the present invention, the diffractive plate consists of a two-stage diffractive plate(diffractive plates (30, 40)), but may be consist of a three- or four-stage diffractive plate etc. for example, as required.

FIG. 2 is a configuration view illustrating a flow of the cleaning liquid in the multi-stage multifilter type diffractive deodorizer according to the present invention.

The cleaning liquid that has overflowed the diffractive plate (30) circulates along a pipe (21) into the tank (20), and the diffractive plate (40) is fed with the cleaning liquid through the pipe (12), and the cleaning liquid that has overflowed the diffractive plate (40) circulates along a pipe (13) into the tank (10). The cleaning liquid in the tank (10) is fed along the pipe (12) to an upper side of the distribution plate (41) by a circulation pump (11).

In the present invention, the tank (20) for storing the cleaning liquid circulating in the primary deodorization system and the tank (10) for storing the cleaning liquid circulating in the secondary deodorization system are separately installed, whereby the deodorization efficiency can be increased. If the cleaning liquid in the tank (10) has been severely polluted, it is discharged outward through a valve (14) and the tank is replenished with clean cleaning liquid, as required. This matter regarding the tank (10) may be applied to the cleaning liquid in the tank (20).

Figure 6:
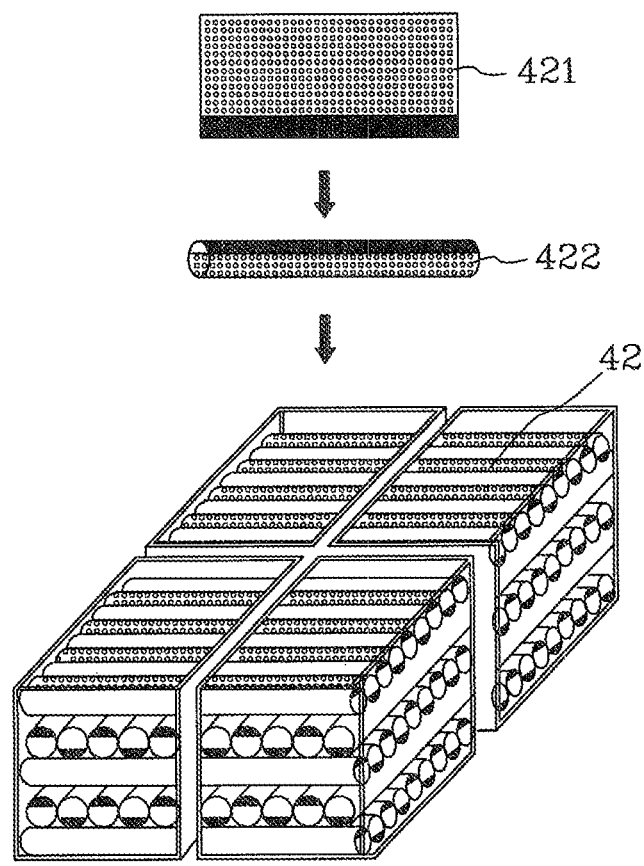
FIG. 6 is a schematic perspective view illustrating a multifilter (42) and each filter member for producing the multifilter (42).

The multifilter (42) installed in the secondary deodorization system includes four filters arranged sequentially, wherein each filter consists of a plurality of layer structures arranged in zigzag. The four filters do not have to be supported by supporting means and may be disposed on the diffractive plate (40) as they are. Each filter member is produced by shaping a sheet-like filter (421) into a cylindrical filter (422), and a plurality of the cylindrical filters are arranged in zigzag with every two adjacent non-perforated portions being oppositely positioned, whereby filtering efficiency is enhanced. FIG. 6 is a schematic perspective view illustrating the multifilter (42) and each filter member for producing the multifilter (42).

In the sheet-like filter (421) and the cylindrical filter (422) of the FIG. 6, a portion shown in black is the non-perforated portion and the rest is a portion where holes are punched at constant intervals. After the sheet-like filters (421) are rolled into a cylindrical form to produce the cylindrical filters (422), the cylindrical filters are arranged in zigzag with every two adjacent non-perforated portions being oppositely positioned, whereby the filtering efficiency is enhanced.

The four filters do not have to be supported by the supporting means and may be disposed on the diffractive plate (40) as they are. Thus, access through a door (45) formed in the body is convenient when the filters are replaced or cleaned. The filters may be sequentially withdrawn one by one to be cleaned or replaced, and thereafter may be sequentially introduced again one by one.

The clean gas that has been finally cleaned while passing through the eliminator (43) is discharged to the external atmosphere through an outlet.

In the diffractive deodorizer of the present invention, the cleaning liquid and the gas form the vortex by means of the impingement jet principle or spray nozzle principle and the multi-stage diffractive plate is installed, whereby the deodorizing efficiency is increased and a deodorizer can be provided which is convenient in maintenance.

Simple modifications or alterations of the present invention may be easily made by those skilled in the art, and such modifications or alterations may be considered to be all included within the scope of the present invention.

What is claimed is:

1. A deodorizer system for cleaning polluted gas, the system comprising:
   a first tank containing a first cleaning fluid therein;
   a gas feeding duct to inject the polluted gas into the first cleaning fluid, wherein the polluted gas is impinged into the first cleaning fluid to allow the gas and the first cleaning fluid to spurt upwards;
   a first diffractive plate disposed above the first tank, wherein the spurted gas and fluid pass through the first diffractive plate thereby deodorizing the gas;
   a first eliminator installed above the first diffractive plate, where the deodorized gas from the first diffractive plate passes through the first eliminator;
   a distribution plate installed above the first eliminator;
   a second diffractive plate installed above the distribution plate, wherein the gas from the first eliminator bypass the distribution plate and is directed to the second diffractive plate, wherein the second diffractive plate receives a second cleaning fluid from the distribution plate thereby further deodorizing the gas;
   a multi-filter installed above the second diffractive plate;
   a second eliminator installed above the multi-filter; and
   a second tank containing the second cleaning fluid, wherein the second cleaning fluid is delivered from the second tank via a first pipe to the distribution plate,
   wherein the spurted first cleaning fluid is returned from the first diffractive plate to the first tank via a second pipe,
   wherein the second cleaning fluid is returned from the second diffractive plate to the second tank via a third pipe,
   wherein the multi-filter comprises a stack of first and second filter array layers, wherein the first array layer has a horizontal array of first sub-filters, and the second array layer has a horizontal array of second sub-filters, and all of the first sub-filters have a first orientation and all of the second sub-filters have a second orientation and the first orientation crosses with second orientation, wherein each of the first and the second sub-filters has an elongate hollow cylindrical shape, wherein each of the first and the second sub-filters has a first portion having holes defined therein and a second portion being free of holes, and wherein one of the first portions of neighboring sub-filters faces upwards while the other of the first portions of the neighboring sub-filters faces downwards.

2. The system of claim 1, wherein between the distribution plate and second diffractive plate, spurting nozzles are formed to allow the second cleaning fluid on the distribution plate to spurt upwards.

3. The system of claim 1, further comprising a circulation pump to allow the second cleaning fluid from the second tank to be forcedly passed onto the distribution plate.

* * * * *